(12) United States Patent
Maeda

(10) Patent No.: US 11,073,117 B2
(45) Date of Patent: Jul. 27, 2021

(54) INTAKE MANIFOLD

(71) Applicant: TOYOTA BOSHOKU KABUSHIKI KAISHA, Aichi (JP)

(72) Inventor: Kunitaka Maeda, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/890,366

(22) Filed: Jun. 2, 2020

(65) Prior Publication Data

US 2020/0400109 A1    Dec. 24, 2020

(30) Foreign Application Priority Data

Jun. 21, 2019 (JP) .............................. JP2019-115857

(51) Int. Cl.
*F02M 35/104* (2006.01)
*F02M 35/10* (2006.01)
*F02M 35/112* (2006.01)

(52) U.S. Cl.
CPC .... *F02M 35/104* (2013.01); *F02M 35/10052* (2013.01); *F02M 35/10091* (2013.01); *F02M 35/10111* (2013.01); *F02M 35/10157* (2013.01); *F02M 35/10236* (2013.01); *F02M 35/112* (2013.01)

(58) Field of Classification Search
CPC ........... F02M 35/104; F02M 35/10157; F02M 35/10236; F02M 35/112; F02M 35/10091; F02M 35/10111; F02M 35/10052
See application file for complete search history.

(56) References Cited

U.S. PATENT DOCUMENTS

2002/0066431 A1* 6/2002 Ino ...................... F02B 27/0263
                                                           123/184.55

FOREIGN PATENT DOCUMENTS

JP    2009-203966    9/2009
JP    2013-053582    3/2013

* cited by examiner

*Primary Examiner* — Jacob M Amick
(74) *Attorney, Agent, or Firm* — Greenblum & Bernstein, P.L.C.

(57) ABSTRACT

The intake manifold includes an intake air introduction port, a surge tank and a plurality of intake pipes. The intake air introduction port is connected to one end side of the surge tank in a direction in which the intake pipes are arranged. The surge tank is provided with a stepped portion over the direction in which the intake pipes are arranged. The stepped portion has an erected wall erected from a surface of the surge tank and connected to the plurality of intake pipes, and a curved wall connecting a tip side of the erected wall and the surface of the surge tank. Further, the surge tank is provided with a concave portion recessed toward the stepped portion at an intermediate portion in the direction in which the intake pipes are arranged.

5 Claims, 5 Drawing Sheets

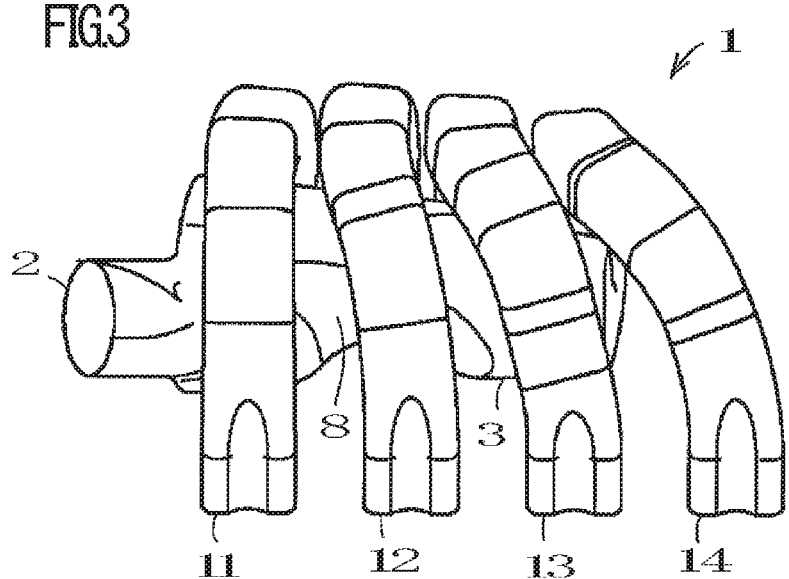
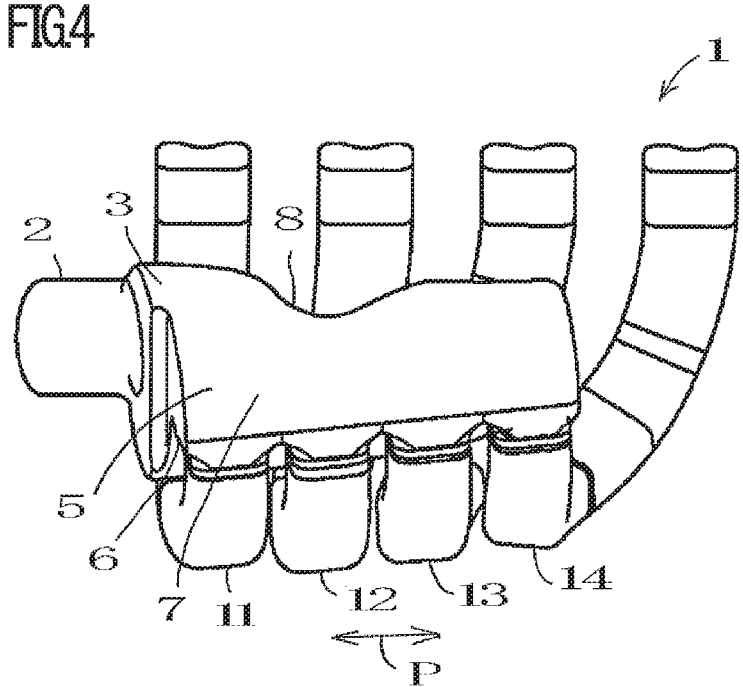

INTAKE MANIFOLD

CROSS REFERENCE TO RELATED APPLICATIONS

The present application claims priority under 35 U.S.C. § 119 of Japanese Application No. 2019-115857 filed on Jun. 21, 2019, the disclosure of which is expressly incorporated by reference herein in its entirety.

BACKGROUND OF THE INVENTION

(1) Field of the Invention

The present invention relates to an intake manifold, and, more particularly, to an intake manifold in which a plurality of intake pipes are arranged side by side so as to surround a surge tank.

(2) Description of Related Art

A conventional intake manifold including an intake air introduction port, a surge tank into which intake air is introduced from the intake air introduction port, and a plurality of intake pipes branching from the surge tank and arranged side by side so as to surround the surge tank, wherein the intake air introduction port is connected to one end side of the surge tank in a direction in which the plurality of intake pipes are arranged is generally known (for example, see JP 2009-203966 A and JP 2013-053582 A).

JP 2009-203966 A discloses a technique in which a protrusion is provided on an inner wall of a surge tank in order to enhance the distribution of intake air to each intake pipe. JP 2013-053582 A discloses a technique in which, in order to enhance the distribution of intake air to each intake pipe, a control wall is provided on a depth region side of the intake air flow in the surge tank to form a space having a small cross-sectional area.

However, in the techniques described in JP 2009-203966 A and JP 2013-053582 A, each intake pipe is simply connected to a surface of the surge tank. Thus, when the intake air flowing through the surge tank is introduced into each intake pipe, the course of the intake air changes rapidly, leading to an increase in pressure loss. In particular, in the technique described in JP 2009-203966 A, a protrusion is provided on the inner wall of the surge tank, and thus the pressure loss in the surge tank increases. Furthermore, in the technique described in JP 2013-053582 A, a control wall is provided on the depth region side of the intake air flow in the surge tank to form a space having a small cross-sectional area. So, the intake air easily flows to the intake pipe closest to the intake air introduction port depending, for example, on the shape of the intake air introduction port.

SUMMARY OF THE INVENTION

An embodiment of the present invention has been made in view of the above actual situation, and an object thereof is to provide an intake manifold that can enhance the distribution of intake air to each intake pipe while reducing the pressure loss.

The present embodiment provides an intake manifold including an intake air introduction port, a surge tank into which intake air is introduced from the intake air introduction port, and a plurality of intake pipes branching from the surge tank and arranged side by side so as to surround the surge tank, the intake air introduction port being connected to one end side of the surge tank in a direction in which the intake pipes are arranged. The surge tank is provided with a stepped portion over the direction in which the intake pipes are arranged. The stepped portion has an erected wall erected from a surface of the surge tank and connected to the plurality of intake pipes, and a curved wall connecting a tip side of the erected wall and the surface of the surge tank. The surge tank is provided with a concave portion recessed toward the stepped portion at an intermediate portion in the direction in which the intake pipes are arranged.

In another embodiment, the concave portion may have a wall surface facing a connection port of the intake air introduction port to the surge tank.

In another embodiment, the plurality of intake pipes may include at least a first intake pipe, a second intake pipe and a third intake pipe arranged in ascending order of the distance from the intake air introduction port, and a deepest portion of the concave portion may be arranged at a position corresponding to a connection port of the second intake pipe to the erected wall in the direction in which the intake pipes are arranged.

In the intake manifold of the present embodiment, the surge tank is provided with a stepped portion over a direction in which the intake pipes are arranged; the stepped portion has an erected wall erected from a surface of the surge tank and connected to the plurality of intake pipes, and a curved wall connecting a tip side of the erected wall and the surface of the surge tank; and the surge tank is provided with a concave portion that is concave toward the stepped portion at an intermediate portion in the direction in which the intake pipes are arranged. Thus, the intake air introduced into the surge tank from the intake air introduction port is introduced into each intake pipe with its course changed gently by a wall surface of the concave portion or a curved wall of the stepped portion. As a result, it is possible to enhance the distribution of intake air to each intake pipe while reducing the pressure loss.

Further, when the concave portion has a wall surface facing a connection port of the intake air introduction port to the surge tank, it is possible to further enhance the distribution of intake air to each intake pipe while further reducing the pressure loss.

Further, when the plurality of intake pipes include at least a first intake pipe, a second intake pipe and a third intake pipe, and a deepest portion of the concave portion is arranged at a position corresponding to a connection port of the second intake pipe to the erected wall in the direction in which the intake pipes are arranged, it is possible to further enhance the distribution of intake air to each intake pipe while further reducing the pressure loss.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 3 is a view taken in the direction of an arrow III in FIG. 2;

FIG. 4 is a view taken in the direction of an arrow IV in FIG. 2;

FIGS. 7A to 7D are cross-sectional views of a main part in FIG. 2, in which FIG. 7A shows a cross section taken along a line a-a, FIG. 7B shows a cross section taken along a line b-b, FIG. 7C shows a cross section taken along a line c-c, and FIG. 7D shows a cross section taken along a line d-d FIGS. 8E to 8G are cross-sectional views of the main part in FIG. 2, in which FIG. 8E shows a cross section taken along a line e-e, FIG. 8F shows a cross section taken along a line f-f, and FIG. 8G shows a cross section taken along a line g-g.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
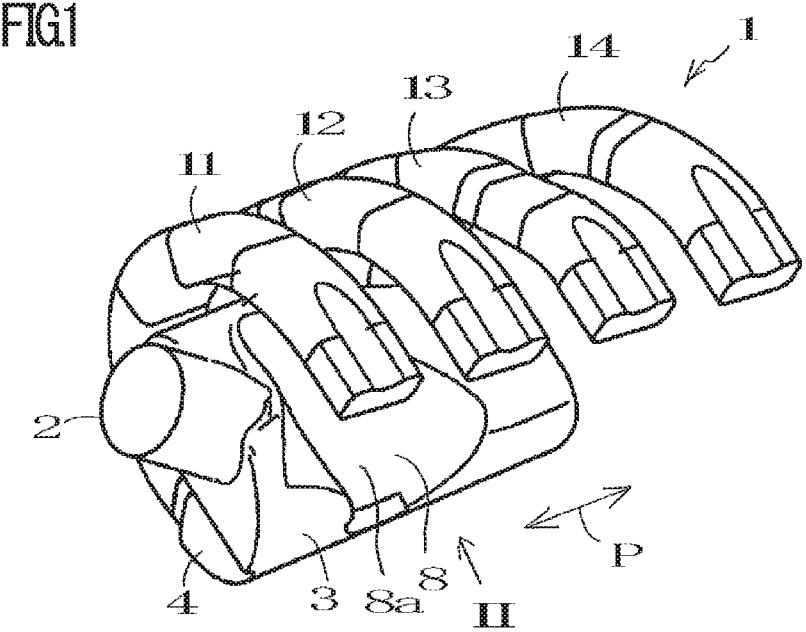
FIG. 1 is a perspective view of an intake manifold according to an example.
Figure 2:
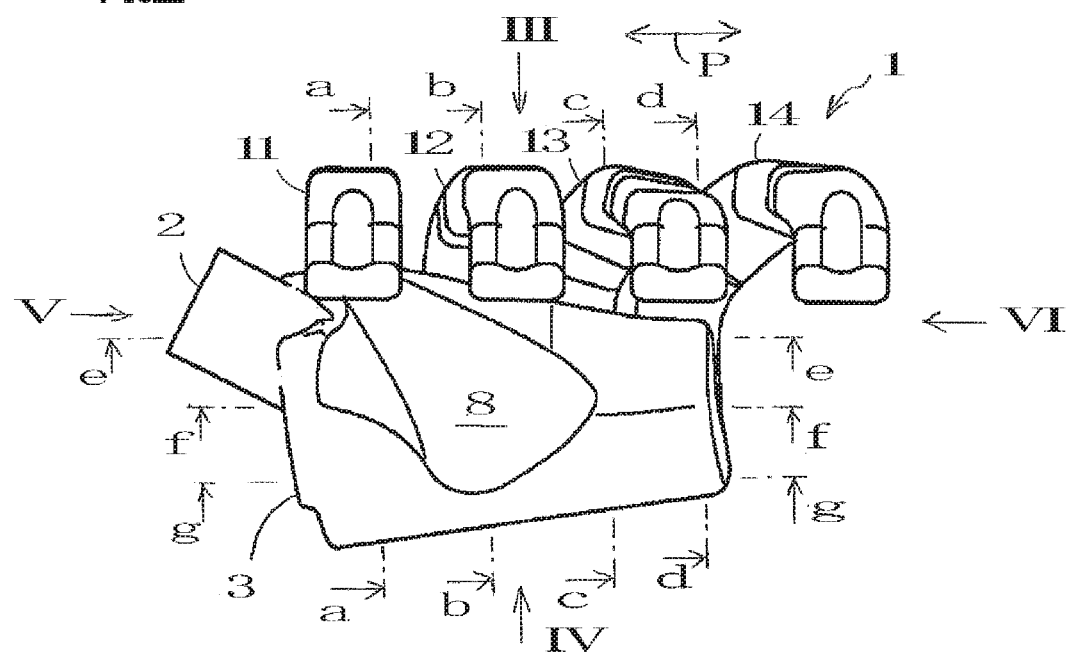
FIG. 2 is a view taken in the direction of an arrow II in FIG. 1.
Figure 5:
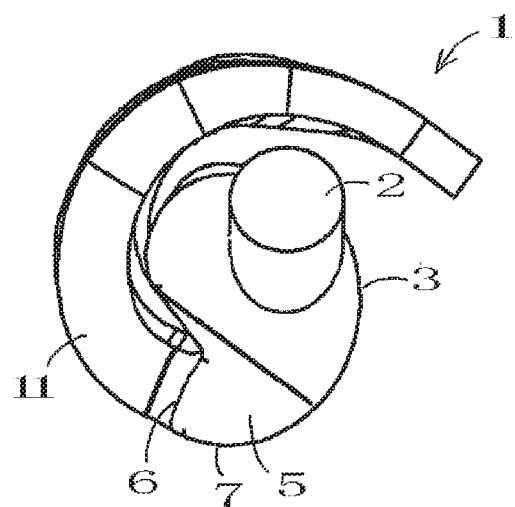
FIG. 5 is a view taken in the direction of an arrow V in FIG. 2.
Figure 6:
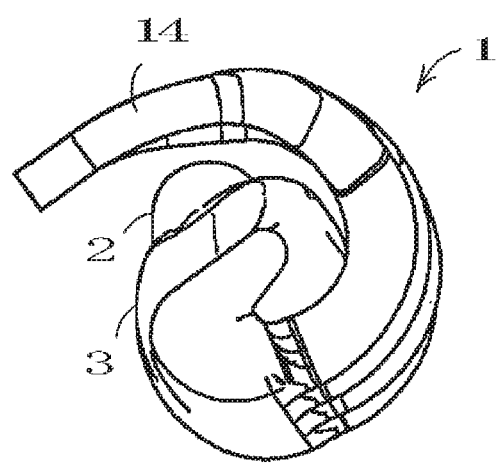
FIG. 6 is a view taken in the direction of an arrow VI in FIG. 2.
Figure 7D:
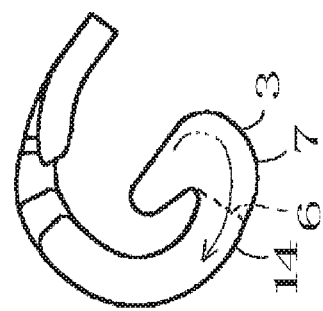
Figure 7C:
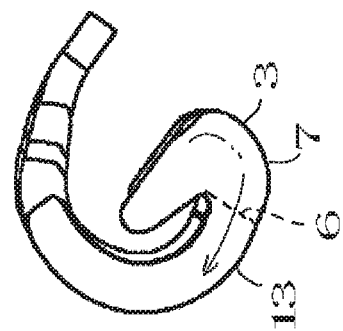
Figure 7B:
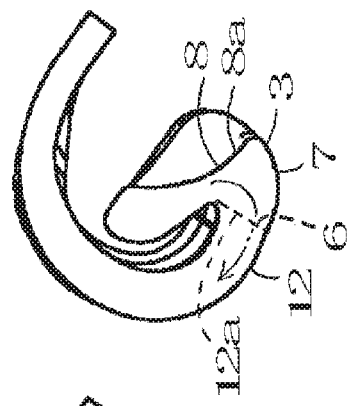
Figure 7A:
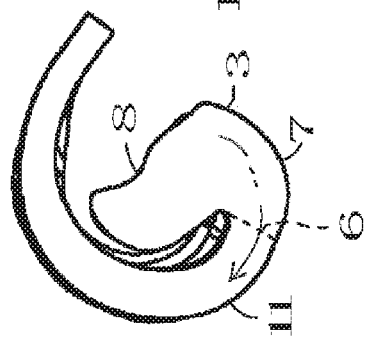

An intake manifold (1) according to the present embodiment includes, for example, as shown in FIGS. 1 and 2, an intake air introduction port (2), a surge tank (3) into which intake air is introduced from the intake air introduction port (2), and a plurality of intake pipes (11 to 14) branching from the surge tank (3) and arranged side by side so as to surround the surge tank (3). The intake air introduction port (2) is connected to one end side of the surge tank (3) in a direction (P) in which the plurality of intake pipes are arranged. For example, as shown in FIGS. 4, 5 and 7, the surge tank (3) is provided with a stepped portion (5) over a direction (P) in which the intake pipes are arranged. The stepped portion (5) has an erected wall (6) erected from a surface of the surge tank (3) and connected to the plurality of intake pipes (11 to 14), and a curved wall (7) connecting a tip side of the erected wall (6) and the surface of the surge tank (3). Further, for example, as shown in FIGS. 1 and 2, the surge tank (3) is provided with a concave portion (8) that is recessed toward the stepped portion (5) at an intermediate portion in the direction (P) in which the intake pipes are arranged.

Figure 8E:
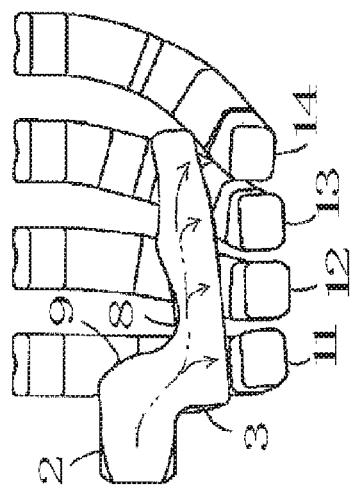
Figure 8F:
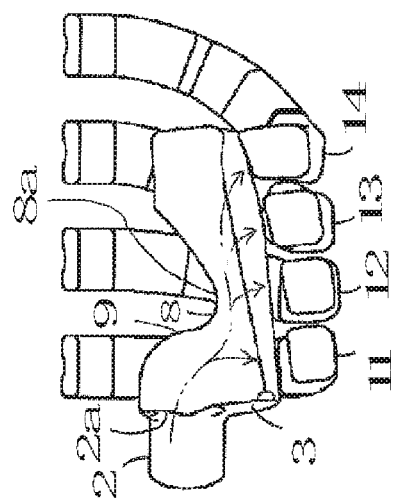
Figure 8G:
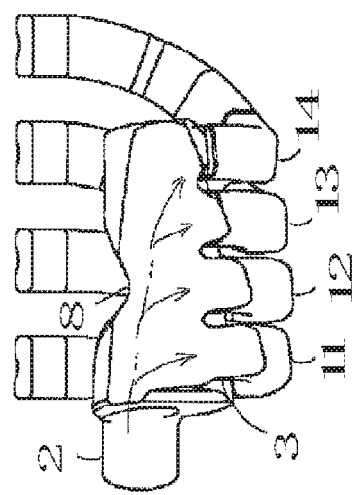

As the intake manifold (1) according to the present embodiment, there is indicated a form in which the concave portion (8) has a wall surface (9) facing a connection port (2a) of the intake air introduction port (2) to the surge tank (3), for example, as shown in FIG. 8.

As the intake manifold (1) according to the present embodiment, there is indicated a form in which the plurality of intake pipes include at least a first intake pipe (11), a second intake pipe (12) and a third intake pipe (13) arranged in ascending order of the distance from the intake air introduction port (2), and a deepest portion (8a) of the concave portion (8) is arranged at a position corresponding to a connection port (12a) of the second intake pipe (12) to the erected wall (6) in the direction (P) in which the intake pipes are arranged, for example, as shown in FIGS. 7 and 8.

Note that reference numerals in parentheses attached to the respective components described in the above embodiment indicate correspondence relationships with specific components described in the Example which will be described later.

Example

Hereinafter, the present invention will be described in detail by way of examples with reference to the accompanying drawings.

1) Configuration of Intake Manifold

As shown in FIGS. 1 to 6, an intake manifold 1 according to the present example includes: an intake air introduction port 2 from which intake air is introduced; a surge tank 3 into which intake air is introduced from the intake air introduction port 2; four intake pipes. i.e., a first intake pipe 11, a second intake pipe 12, a third intake pipe 13 and a fourth intake pipe 14, branching from the surge tank 3 and arranged side by side so as to surround the surge tank 3. The intake manifold 1 is formed by joining a plurality of resin components through welding or the like.

The intake air introduction port 2 is connected to one end side of the surge tank 3 in a direction P in which the intake pipes are arranged. The intake air introduction port 2 is formed in a cylindrical shape whose axis is inclined with respect to the direction P in which the intake pipes are arranged. Further, the intake air introduction port 2 is provided so as to introduce intake air into the surge tank 3 toward the bottom side of a concave portion 8 which will be described later (see FIG. 2).

The surge tank 3 is formed in the shape of a container that is long in the direction P in which the intake pipes are arranged. The surge tank 3 is provided with a stepped portion 5 bulging outward over the direction P in which the intake pipes are arranged. The stepped portion 5 has an erected wall 6 that is erected from a surface of the surge tank 3 and connected to one end side of each of the intake pipes 11 to 14; and a curved wall 7 that connects a tip side of the erected wall 6 and the surface of the surge tank 3 (see FIGS. 4, 5 and 7). The curved wall 7 extends to the side opposite to each of the intake pipes 11 to 14.

The surge tank 3 is provided with the concave portion 8 that is recessed in a bowl shape toward the stepped portion 5 at an intermediate portion in the direction P in which the intake pipes are arranged. A deepest portion 8a of the concave portion 8 is arranged at a position corresponding to a connection port 12a of the second intake pipe 12 to the erected wall 6 in the direction P in which the intake pipes are arranged (see FIGS. 7 and 8). Further, the concave portion 8 has a curved wall surface 9 facing a connection port 2a of the intake air introduction port 2 to the surge tank 3 (see FIG. 8F).

2) Action of Intake Manifold

Next, the action of the intake manifold 1 having the above configuration will be described. In the intake manifold 1, intake air is introduced into the surge tank 3 from the intake air introduction port 2 when an engine operates. The introduced intake air is distributed to each of the intake pipes 11 to 14 and sent to each intake port of the engine with its course changed gently by the wall surface 9 of the concave portion 8 or the curved wall 7 of the stepped portion 5.

Specifically, as shown by phantom lines in FIGS. 7 and 8, in the intake air introduced into the surge tank 3 from the intake air introduction port 2, the intake air guided by the wall surface 9 of the concave portion 8 and the curved wall 7 of the stepped portion 5 is mainly distributed to the first intake pipe 11. Further, the intake air flowing under the deepest portion 8a of the concave portion 8 is mainly distributed to the second intake pipe 12. Further, the intake air flowing under a shallow portion of the concave portion 8 and flowing so as to avoid the concave portion 8 is mainly distributed to the third and fourth intake pipes 13 and 14.

(3) Effects of Example

In the intake manifold of the present example, the surge tank 3 is provided with the stepped portion 5 over the direction P in which the intake pipes are arranged; the stepped portion 5 has the erected wall 6 erected from the surface of the surge tank 3 and connected to the plurality of intake pipes 11 to 14, and the curved wall 7 connecting the tip side of the erected wall 6 and the surface of the surge tank 3; and the surge tank 3 is provided with the concave portion 8 that is recessed toward the stepped portion 5 at the intermediate portion in the direction P in which the intake pipes are arranged. Thus, the intake air introduced into the surge tank 3 from the intake air introduction port 2 is introduced into each of the intake pipes 11 to 14 with its course changed gently by the wall surface 9 of the concave portion 8 or the curved wall 7 of the stepped portion 5. As a result, it is possible to enhance the distribution of intake air to each of the intake pipes 11 to 14 while reducing the pressure loss.

Further, in the present example, the concave portion 8 has the wall surface 9 facing the connection port 2a of the intake air introduction port 2 to the surge tank 3. As a result, it is possible to further enhance the distribution of intake air to each of the intake pipes 11 to 14 while further reducing the pressure loss.

Further, in the present example, the deepest portion 8a of the concave portion 8 is arranged at a position corresponding to the connection port 12a of the second intake pipe 12 to the erected wall 6 in the direction P in which the intake pipes are arranged. As a result, it is possible to further enhance the distribution of intake air to each of the intake pipes 11 to 14 while further reducing the pressure loss.

The present invention is not limited to the above-described examples, and can be variously modified within the scope of the present invention depending on the purpose and use. That is, in the above example, the intake manifold 1 including the four intake pipes 11 to 14 has been illustrated, but the present invention is not limited thereto. For example, the intake manifold 1 may include three or five or more intake pipes.

Further, in the above example, the intake manifold 1 made of a resin has been illustrated, but the present invention is not limited thereto. For example, the intake manifold 1 may be made of a metal.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

The present invention is widely used as a technique related to an intake manifold that supplies intake air to each intake port of an engine used in vehicles such as passenger cars, buses and trucks.

What is claimed is:

1. An intake manifold comprising:
   an intake air introduction port;
   a surge tank into which intake air is introduced from the intake air introduction port; and
   a plurality of intake pipes branching from the surge tank and arranged side by side so as to surround the surge tank, the intake air introduction port being connected to one end side of the surge tank in a direction in which the plurality of intake pipes are arranged,
   wherein the surge tank is provided with a stepped portion over the direction in which the plurality of intake pipes are arranged,
   wherein the stepped portion has an erected wall erected from a surface of the surge tank and connected to the plurality of intake pipes, and a curved wall connecting a tip side of the erected wall and the surface of the surge tank,
   wherein the surge tank is provided with a concave portion recessed toward the stepped portion at an intermediate portion in the direction in which the plurality of intake pipes are arranged, and
   wherein the concave portion is configured such that a distance between a bottom of the concave portion and the curved wall increases as the concave portion extends further from the intake air introduction port in the direction in which the plurality of intake pipes are arranged.

2. The intake manifold according to claim 1, wherein the concave portion has a wall surface facing a connection port of the intake air introduction port to the surge tank.

3. A intake manifold comprising:
   an intake air introduction port;
   a surge tank into which intake air is introduced from the intake air introduction port; and
   a plurality of intake pipes branching from the surge tank and arranged side by side so as to surround the surge tank, the intake air introduction port being connected to one end side of the surge tank in a direction in which the plurality of intake pipes are arranged,
   wherein the surge tank is provided with a stepped portion over the direction in which the plurality of intake pipes are arranged,
   wherein the stepped portion has an erected wall erected from a surface of the surge tank and connected to the plurality of intake pipes, and a curved wall connecting a tip side of the erected wall and the surface of the surge tank,
   wherein the surge tank is provided with a concave portion recessed toward the stepped portion at an intermediate portion in the direction in which the plurality of intake pipes are arranged, wherein the plurality of intake pipes include at least a first intake pipe, a second intake pipe and a third intake pipe arranged in ascending order of the distance from the intake air introduction port, and wherein a deepest portion of the concave portion is arranged at a position corresponding to a connection port of the second intake pipe to the erected wall in the direction in which the plurality of intake pipes are arranged.

4. The intake manifold according to claim 1, wherein the plurality of intake pipes include at least a first intake pipe, a second intake pipe and a third intake pipe arranged in ascending order of the distance from the intake air introduction port, and wherein a deepest portion of the concave portion is arranged at a position corresponding to a connection port of the second intake pipe to the erected wall in the direction in which the plurality of intake pipes are arranged.

5. The intake manifold according to claim 3, wherein the concave portion has a wall surface facing a connection port of the intake air introduction port to the surge tank.

* * * * *